P. LUTTEKE.
Velocipede.

No. 95,701.

Patented Oct. 12, 1869.

WITNESSES:

INVENTOR:

United States Patent Office.

PETER LUTTEKE, OF ST. LOUIS, MISSOURI.

IMPROVEMENT IN VEHICLES PROPELLED BY HAND.

Specification forming part of Letters Patent No. 95,701, dated October 12, 1869.

*To all whom it may concern:*

Be it known that I, PETER LUTTEKE, of St. Louis, in the county of St. Louis, State of Missouri, have made certain new and useful Improvements in Vehicles Propelled by Hand-Power; and I do hereby declare the following to be a full and true description thereof, reference being being had to the accompanying drawings, and to the letters of reference marked thereon.

The invention relates to vehicles whereon the operator seats himself, and, by hand-power, propels the vehicle and its load; and the nature of said invention is in the manner of applying the power of the operator to cause the axle of the driving-wheels to revolve, and in the arrangement of the vehicle itself, as hereinafter more fully explained.

Figure 1:
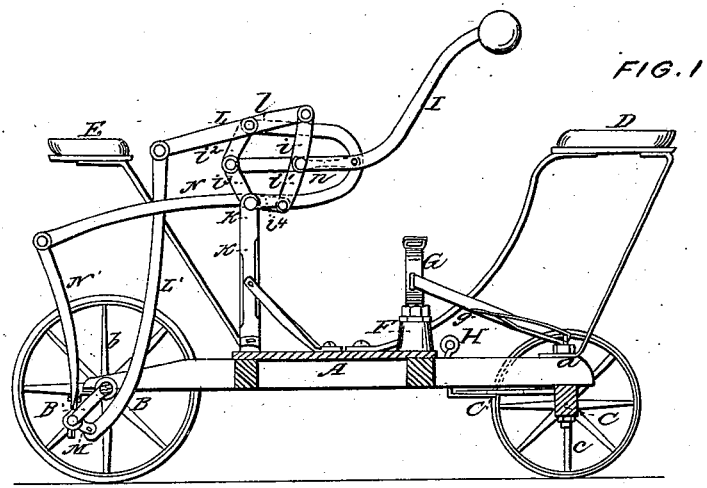
Figure 2:
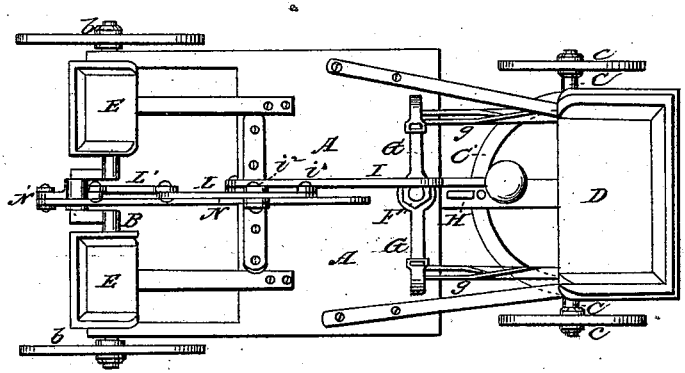
Figure 3:
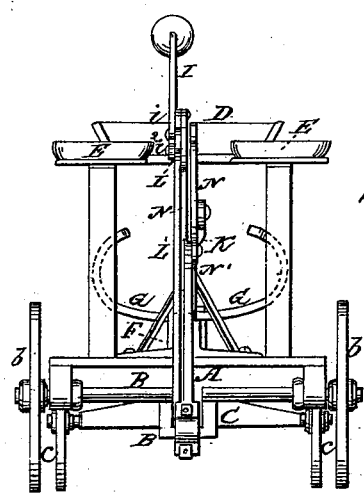

To enable those herein skilled to make and use said vehicle, I will now more fully describe the same, referring herein to the accompanying Figure 1 as a longitudinal sectional elevation, to Fig. 2 as a plan, and to Fig. 3 as a front view.

I arrange my said vehicle with a frame, A, supported upon a front or crank axle, B, which is usually of iron, and to this are secured the wheels $b$, the frame being at the rear, supported upon the axle C, resting on wheels $c$, which turn loosely on said axle. The frame A is pivoted on the rear axle at a point, $a$, by a suitable bolt.

Upon the frame A are arranged seats D and E, upon proper brackets. The operator sits upon the seat D and propels, by lever and other devices, hereinafter described, the axle B to cause revolution thereof. By using his feet he determines simultaneously the course of the vehicle by turning the axle C in a horizontal plane about the pivot $a$. For this purpose of steerage, I arrange a standard, F, upon the frame A, whereon is pivoted a foot-bar, G. This connects, by bands $g$, with the axle C, to turn the same. To guide the axle, an arc, C', is attached thereon, fitting under the frame A and moving within a proper guide. The segment-arc C' has holes to receive a pin, H, which the operator inserts to hold the axle C when, for a long distance, an unchanged course is to be run.

The propelling action is achieved in the manner following: Within easy reach of the operator, I arrange a lever, I, connecting with two sets of toggle-links, $i$ $i'$ and $i^2$ $i^3$. The lower link, $i'$, has a joint-link, $i^4$, which meets the link $i^3$ at the point where both connect with the standard K at $k$. The several links are joined by proper pins to move freely, and the links $i$ and $i^2$ are connected with the vibrating bar L, so that the joint $l$ forms a movable fulcrum, while the forward joint, with the link $i$, is the attachment of the power to move. The vibrator L connects, by a proper rod, L', with the collar M on the crank B' of the axle B. By the arrangement of links and bars thus described, it is plain that the vibrator L is not only turned about its pivot $l$, but also has a slight horizontal movement, the horizontal movement being caused by the toggles $i$ $i'$ and $i^2$ $i^3$, more especially at a time when the crank B' is on a "dead-center," whereby a suspension of motion is to a certain extent avoided.

In order to again act to prevent the stoppage on the center by a horizontal movement or thrust, I arrange a second vibrator, N, connected to the standard K at $k$, and curved, as indicated in Fig. 1, to a joint at $l$ with the link $i^2$, the joint with the toggles $i$ $i'$ being made by a link, $n$. The bar N extends forward, connecting, by a rod, N', with the collar M on the crank B', this connection being made about at right angles to the connection of the rod L' with the collar M, as shown in Fig. 1.

The arrangement of the vibrators L and N is such that the direction or position of their connecting-rods L' and N', shall be different to such a degree that when one rod is ineffective for power the other shall be capable of action to prevent suspension of the axle-movement.

The vibrator L, which has a horizontal as well as a vertical rocking movement, to operate a connecting-rod and crank, may be applied to machinery generally, with success, to act in connection with the usual pitman-and-crank movement to avoid stoppage on centers.

Having thus fully described my invention, what I claim is—

The hand-lever I, combined with the vibrator L and N by the toggle-links $i$ $i'$ $i^2$ $i^3$, the fulcrum K, and rods L' and N', collar M and crank B'; operating substantially as and for the purposes set forth.

PETER LUTTEKE.

Witnesses:
GEORGE P. HERTHEL, Jr.,
WILLIAM W. HERTHEL.